(12) United States Patent
Williams

(10) Patent No.: US 10,689,970 B2
(45) Date of Patent: Jun. 23, 2020

(54) ESTIMATING PRESSURE FOR HYDRAULIC FRACTURING

(71) Applicant: Schlumberger Technology Corporation, Sugar Land, TX (US)

(72) Inventor: Michael John Williams, Ely (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 23 days.

(21) Appl. No.: 15/568,962

(22) PCT Filed: Apr. 25, 2016

(86) PCT No.: PCT/US2016/029108
§ 371 (c)(1),
(2) Date: Oct. 24, 2017

(87) PCT Pub. No.: WO2016/172667
PCT Pub. Date: Oct. 27, 2016

(65) Prior Publication Data
US 2018/0119541 A1  May 3, 2018

Related U.S. Application Data

(60) Provisional application No. 62/152,058, filed on Apr. 24, 2015.

(51) Int. Cl.
*E21B 47/06* (2012.01)
*E21B 43/26* (2006.01)
(Continued)

(52) U.S. Cl.
CPC .............. *E21B 47/06* (2013.01); *E21B 43/26* (2013.01); *E21B 47/00* (2013.01); *G01F 25/00* (2013.01);
(Continued)

(58) Field of Classification Search
CPC .......... E21B 47/00; E21B 47/06; E21B 43/26; G01F 25/00; G01H 9/00; G01V 1/02; G01V 1/40
See application file for complete search history.

(56) References Cited

U.S. PATENT DOCUMENTS 4,858,130 A * 8/1989 Widrow ................. E21B 43/26
702/11
5,720,598 A   2/1998 De Chizzelle
(Continued)

FOREIGN PATENT DOCUMENTS

WO   WO 2011048373   *   4/2011   ............... G01H 9/00
WO   WO2011048373 A2   4/2011

OTHER PUBLICATIONS

Grechka, V. et al., "Microseismic interferometry", SEG Technical Program Expanded Abstracts, 2013, 6 pages.
(Continued)

*Primary Examiner* — Yong-Suk Ro

(57) ABSTRACT

A method for estimating downhole pressure in wells during a treatment procedure. A pressure head in a treatment well may be determined without requiring downhole sensors. The method for measuring downhole pressure may be used in long horizontal wells. By improving the accuracy of such pressure head estimates and providing the data substantially in real time, the data can also be used to control the treatment being applied to the well. The pressure head may be determined by detecting pump harmonics at a detector, typically positioned outside of the well and/or not in direct contact with the fluid in the well. The detector may be a microseismic array.

19 Claims, 12 Drawing Sheets

(51) Int. Cl.
  *G01F 25/00* (2006.01)
  *G01V 1/02* (2006.01)
  *G01H 9/00* (2006.01)
  *E21B 47/00* (2012.01)
  *G01V 1/40* (2006.01)

(52) U.S. Cl.
  CPC ............... *G01H 9/00* (2013.01); *G01V 1/02* (2013.01); *G01V 1/40* (2013.01)

(56) References Cited

U.S. PATENT DOCUMENTS

| | | |
|---|---|---|
| 8,584,519 B2 | 11/2013 | Maida et al. |
| 2007/0137860 A1 | 6/2007 | Lovell et al. |
| 2012/0160481 A1 | 6/2012 | Williams |
| 2014/0126325 A1 | 5/2014 | Farhadirousan et al. |

OTHER PUBLICATIONS

Hou, R. et al., "Acoustic monitoring of pipeline flows: particulate slurries", Powder Technology, 1999, 106, pp. 30-36.

Miyazawa, M. et al., "Application of seismic interferometry to extract P- and S-wave propagation and observation of shear-wave splitting from noise data at Cold Lake, Alberta, Canada", Geophysics, 2008, 73(4), pp. D35-D40.

Rockwell, D. et al., "Self-generation of organized waves in an impinging turbulent jet at low Mach number", Journal of Fluid Mechanics, 1982, pp. 425-441.

Scholz, C. H., "The Frequency-Magnitude Relation of Microfracturing in Rock and its Relation to Earthquakes", Bulletin of the Seismological Society of America, 58(1), 1968, pp. 399-415.

Tary, J. B. et al., "Potential use of resonance frequencies in microseismic interpretation", The Leading Edge, 2012, pp. 1338-1346.

International Preliminary Report on Patentability of International Patent Application No. PCT/US2016/029108, dated Nov. 2, 2017, 12 pages.

* cited by examiner

ESTIMATING PRESSURE FOR HYDRAULIC FRACTURING

CROSS REFERENCE PARAGRAPH

This application claims the benefit of U.S. Provisional Application No. 62/152,058, entitled "ESTIMATING PRESSURE FOR HYDRAULIC FRACTURING," filed Apr. 24, 2015, the disclosure of which is hereby incorporated herein by reference.

BACKGROUND

Embodiments of the present disclosure relate to methods and systems for estimating pressure. In particularly, but not limited to, the estimation and/or calculation of downhole pressure in wells.

Hydraulic fracturing models require knowledge of the net pressure between the fluid inside the propagating fracture and the minimum stress of the rock formation. However, this information is in general not measured during fracturing since there is no way to place a pressure gauge inside the propagating fracture.

Technically, the pressure may be measured downhole inside the treatment well (the well being used for hydraulic fracturing) in the case of water-only treatments. However for high rate sand-water fracturing a pressure gauge positioned in the treatment will be destroyed by the high-rate proppant-laden fluid ("sand-blasted").

Where the bottomhole pressure can be estimated, the required net pressure can then be estimated from the bottomhole pressure and assumptions about the pressure drop provided by the perforation. Typically in hydraulic fracturing operations, only a memory gauge is used and so this pressure information is not available in real-time.

As such, it would be useful if downhole pressure information was available in real-time so that the fracture model could be updated and used to aid control of the treatment/hydraulic fracturing.

In vertical wells, the pressure drop in the pipe carrying fluids into the well for the high rate flowing fluid may be reasonably predicted. In which case, the bottomhole pressure may be estimated, and the required net pressure estimated from the predicted pressure drop.

However, in horizontal wells, which may undulate slightly, it is not possible to accurately predict the conditions of multiphase (sand+water+gels etc.) flow and so any estimates of pressure drop are very approximate at best. This uncertainty in pressure drop means that bottomhole pressure can only be poorly estimated; so any subsequent net pressure calculation is even more uncertain.

There is a clear need for improved estimates of the bottom hole conditions of the treatment well during pumping, particularly for high rate treatments delivered through horizontal wells.

Recent Solutions

One approach that attempts to address this need proposed by Downie et al. (Downie, R., J. Le Calvez, M. Williams, B. Dean, INTEGRATION OF FRACTURE DIAGNOSTIC TESTS AND OFFSET WELL STATIC PRESSURE WITH MICROSEISMIC EVALUATION, U.S. Patent Application Ser. No. 61/922,268) places a pressure gauge in an adjacent monitoring well, which monitoring well contains a microseismic monitoring array. Observations made with a pressure gauge in the monitoring well revealed that, in the case where there is pressure communication between the treatment well and the monitoring well (for example in a typical oil shale where thin fractured carbonates interbedded with the source shales provide the producing zones and so pressure communication between producing wells may extend thousands of feet), then such a pressure gauge will show increasing and decreasing trends associated with the net pressure. This is because pressure communication (hydraulic communication) exists in this special case.

However, there are many cases where this solution does not work, e.g. where there is low permeability, pinched layers, lenses of reservoir rock that do not have large lateral extent. In those cases improved estimates are still required.

SUMMARY

Embodiments of the present disclosure provide methods and apparatuses which allow estimates of the pressure head to be produced without requiring downhole sensors. Embodiments of the present disclosure may be used in horizontal wells. Embodiments of the present disclosure provide for accurate determination of pressure head and provide real time data that may be used to control a treatment being applied to a well.

Aspects of the present disclosure provide for methods and apparatuses for estimating the pressure head of a fluid pumped into a well by detecting pump harmonics at a detector positioned outside of the flow.

A first aspect of the present disclosure provides a method of estimating the pressure head of a fluid pumped into a well where the pump or pumps pumping fluid into the well generate vibrations that are transmitted through the fluid at an harmonic frequency, a detector that is not in contact with the fluid detects the vibrations and measures the energy of the received vibrations at the harmonic frequency. The pressure head of the pumped fluid in the well is determined from the measured energy.

In embodiments of the present disclosure it is possible to derive an estimate of the pressure head of the pumped fluid from the measured energy at the or each harmonic frequency. This allows the pressure head to be estimated based on measurements received at a detector which is not located in the well in question, and therefore does not require a downhole pressure gauge to provide the estimate.

Embodiments of the present disclosure provide for determining the bottomhole conditions of a treatment well during pumping. The method may be used to determine bottomhole conditions where the well is subject to high rate treatments and/or comprises a long horizontal well.

In embodiments of the present disclosure, the vibrations may be detected by a microseismic array. The microseismic array may comprise a plurality of receivers and may be located in one or more wells adjacent to or nearby the well into which the fluid is being pumped, or at a surface location adjacent to or nearby the well into which the fluid is being pumped. In some embodiments, the receivers may comprise one or more fibre optic cables.

For example, the vibrations may be detected by a distributed fibre-optic vibration sensor ("DVS"). In some embodiments, the DVS may comprise a heterodyne distributed vibration sensor ("hDVS"), which may be located in the well, but protected from the flow of the fluid. The DVS fibre-optic cable may be permanently cemented into the casing of the well and may detect vibration as longitudinal strain changes on the fibre. Such an arrangement may provide a continuous measurement of the pump harmonics along the length of the well.

Embodiments of the present disclosure may further include filtering the data received by the detector. Such filtering may comprise, for example, using a bandpass filter to filter the data to the known response range of the detector. Alternatively, the filtering may be used to focus the data on the known or expected pump harmonic frequencies, thereby reducing the effects of noise.

Embodiments of the present disclosure may further include calculating the at least one harmonic frequency. This can allow the harmonic frequency or frequencies to be known in advance and therefore more readily identified from the data received by the detector.

For example, the expected pump harmonic frequencies for each pump truck may be calculated as:

$$\text{Harmonic (Hz)} = n\_cylinders * pump\_rate / (60 * pump\_vol\_kfactor)$$

where n_cylinders is the number of cylinders (e.g. 3 for a triplex pump), the pump rate is in barrels per minute (bbl/min) and the pump_vol_kfactor is the design volume of individual cylinders in barrels.

In some embodiments of the present disclosure, measuring the energy of the received vibrations may include performing fast Fourier transforms ("FFT") on the received data repeatedly over time. Fourier transforms allow time-series data to be transformed to frequency-series data and, therefore the energy in the period covered by the transform associated with particular frequencies to be measured.

In some embodiments of the present disclosure, the Fourier transforms are preferably performed on relatively long time windows in order to allow sufficient time for the harmonics to be observed. Typical harmonic frequencies may of the order of 5-20 Hz. In some embodiments of the present disclosure, the window may comprise at least 30 seconds of received data, or in some aspects may comprise at least one minute of received data.

As there may be multiple pumps pumping fluid into the well and generating harmonic vibrations at similar, but slightly different frequencies, good frequency resolution may be necessary to separate harmonic frequencies, which may differ by less than 1% from each other. The resolution of the FFT increases with the time window of data which is processed. Set against this desire to increase the window is the need to provide a time series of data in order for the data to provide a useful overview of the pumping operation.

As typical transit times (the time taken for a change in the surface fluids in the treatment well to reach the perforations at the bottom of the well) are of the order of 2-5 minutes, 30 second or 1 minute windows for the FFT data can provide information and feedback within that time frame, and so can be more than sufficient for the present purposes whilst allowing good frequency resolution.

Alternatively, in some embodiments of the present disclosure, time-domain techniques, such as modulation to recover a specific frequency, can also be used to determine the energy of the vibrations. For example, time-domain techniques may be used when the pump harmonics are known or predicted from measurements made at the pumps.

In some embodiments of the present disclosure, measuring the energy may include summing the energy of all harmonics received at the detector. In some embodiments of the present disclosure, for microseismic monitoring there may be at least 8 and as many as 100 receivers, sometimes monitoring from multiple wells and/or surface locations. In this case, it is possible to produce a stacked amplitude averaged over many recording locations, or to provide a focused calculation by using the usual techniques of seismic migration to back project the pump harmonics onto the wellbore and stack at an imaging point near the perforation.

Embodiments of the present disclosure may include estimating the static head of the fluid in the well prior to the start of pumping the fluid and using this estimated static head to calibrate the determined pressure head of the pumped fluid. This estimate of the static head can be used to scale measured amplitudes of the pump harmonics to an approximate head value.

In some embodiments of the present disclosure, the pressure at the top of the well is measured. Measuring or monitoring the pressure at the wellhead is often unnecessary as it can be assumed that the pump harmonic amplitude is essentially constant or nearly constant at the wellhead. However, by monitoring the pressure at the wellhead, for example using a high frequency pressure gauge such as that proposed in U.S. Pat. No. 5,720,598, an accurate stacked amplitude of the pump harmonics at the wellhead may be determined. In some embodiments of the present disclosure, the difference between the pump harmonics measured at the wellhead and the observed harmonics at the detector requires only an assumption of approximately constant signal attenuation through the Earth.

In some embodiments, the steps of detecting the vibrations, measuring the energy and estimating the pressure/pressure head may be performed substantially in real-time. Here, the term "substantially in real time" is to be interpreted as providing an output within a sufficiently short time of the vibrations being detected that the data can be assumed to be effectively representative of the current situation in the well. Since the method in accordance with some embodiments of the present disclosure, may have built-in delays, for example in accumulating the data for the step of measuring the energy of the received vibrations, actual instantaneous information about the pressure will not be available. However, information should be available approximately a few minutes after the time that it relates to, and this is generally a short enough timescale compared to variations in the pressure within the well being monitored.

In order to be useful in providing real time information about the situation in the treatment well, it is desirable that the estimation data is available on a shorter time frame than it takes for a change in the surface fluids to reach the perforations at the other end of the well (the transit time). Typical transit times are around 2-5 minutes, so performing the steps of detecting, measuring and estimating such that the results are available less than five minutes after the harmonics being produced would provide useful information to an operator. Preferably the cycle is shorter, for example less than two minutes or even less than one minute.

In realistic situations, the pump schedules are generally stepped or staged with planned changes (if any) taking place every 5-20 minutes. Providing the estimate of the head on a timescale which is shorter than this schedule would therefore still be useful. Allowing for interpretation time, the steps of detecting, measuring and estimating are preferably completed within 10 minutes of the harmonics being produced, more preferably within 5 minutes and most preferably within two or one minutes as set out above.

In some embodiments of the present disclosure, when the head is estimated substantially in real time, the estimated values produced can be compared to values expected from the model of the fracturing and adjustments to the pumping, such as adjustments to the fluid loading, can be planned or implemented depending on the results.

Alternatively or additionally, in some embodiments of the present disclosure, the data can be recorded over the duration of the pumping in the well and used in post-job interpretation and modelling of the fracture. Knowing the pressure head in the well and/or the bottomhole pressure is an important factor in modelling how the fracture has developed during the pumping operation.

Embodiments of the present disclosure may include any combination of some, all or none of the above described preferred and optional features.

A second aspect of the present disclosure provides a method of controlling a pumping operation in a well by: estimating the pressure head of the fluid in the well substantially in real time using a method according to the above described first aspect (including some, all or none of the preferred and optional features of that aspect) and controlling the pumping of fluid into the well depending on the estimated pressure head.

In some embodiments of the present disclosure, when the head is estimated substantially in real time, the estimated values produced can be compared to values expected from a model of the fracturing process and adjustments to the pumping, such as adjustments to the fluid loading, can be planned or implemented depending on the results.

The method of the above aspect is preferably implemented by an apparatus according to the third aspect of this invention, as described below, but need not be.

Further aspects of the present disclosure include computer programs for running on computer systems which carry out the methods of the above aspects, including some, all or none of the preferred and optional features of that aspect.

A third aspect of the present disclosure provides an apparatus for estimating the pressure head of fluid pumped into a well. The apparatus comprises a detector that is not in contact with the fluid (this may protect the detector from the pumped fluid) and arranged to receive vibrations generated by one or more pumps pumping the fluid into the well; the vibrations being transmitted from the pump(s) and through the fluid in the well. A processor may be used to process the received vibrations to measure the energy of the vibrations at at least one harmonic frequency of said pumps and estimate a pressure head of the pumped fluid in the well from the measured energy.

Using the apparatus of the present aspect, the pressure head can be estimated based on measurements received at a detector, which is not located in the well in question, and therefore does not require a downhole pressure gauge to provide the estimate.

The present aspect therefore can provide an improved estimate of the bottomhole conditions of a treatment well during pumping, particularly where the well is subject to a high rate treatments and/or is a long horizontal well.

The detector may include a microseismic array. The microseismic array may comprise a plurality of receivers and may be located in one or more wells adjacent to or nearby the well into which the fluid is being pumped and/or at a surface location.

The detector may alternatively or additionally include a distributed fibre-optic vibration sensor ("DVS"), in particular a heterodyne distributed vibration sensor ("hDVS"), which may be located in the well but protected from the flow of the fluid. The DVS fibre-optic cable may be permanently cemented into the casing of the well and can detect vibration as longitudinal strain changes on the fibre. This can provide a continuous measurement of the pump harmonics along the length of the well.

The method may further include one or more steps of filtering the data received by the detector. Such filtering may be, for example, to bandpass filter the data to the known response range of the detector. Alternatively, the filtering may be used to focus the data on the known or expected pump harmonic frequencies, thereby reducing the effects of noise.

The method may further include the step of calculating said at least one harmonic frequency. This can allow the harmonic frequency or frequencies to be known in advance and therefore more readily identified from the data received by the detector.

For example, the expected pump harmonic frequencies for each pump truck may be calculated as:

$$\text{Harmonic (Hz)} \approx n\_\text{cylinders} * \text{pump\_rate} / (60 * \text{pump\_vol\_}k\text{factor})$$

Where: n_cylinders is the number of cylinders (e.g. 3 for a triplex pump), the pump rate is in barrels per minute (bbl/min) and the pump_vol_kfactor is the design volume of individual cylinders in barrels.

In some embodiments of the present disclosure, the processor may measure the energy of the resonant vibrations by performing fast Fourier transforms on the received data repeatedly over time. Fourier transforms allow time-series data to be transformed to frequency-series data and therefore the energy in the period covered by the transform associated with particular frequencies to be measured.

In some embodiments of the present disclosure, the fast Fourier transforms may be performed on relatively long time windows in order to allow sufficient time for the harmonics to be observed. Typical harmonic frequencies may be of the order of 5-20 Hz. In some embodiments of the present disclosure, the window is at least 30 seconds of received data, more preferably at least 1 minute of received data.

As it is likely that there will be multiple pump trucks generating the harmonic vibrations at similar, but slightly different frequencies, good frequency resolution is desirable to separate harmonic frequencies which may differ by less than 1% from each other. The resolution of the FFT increases with the time window of data which is processed. Set against this desire to increase the window is the need to provide a time series of data in order for the data to provide a useful overview of the pumping operation.

As typical transit times (the time taken for a change in the surface fluids in the treatment well to reach the perforations at the bottom of the well) are of the order of 2-5 minutes, 30 second or 1 minute windows for the FFT data can provide information and feedback within that time frame and so can be more than sufficient for the present purposes whilst allowing good frequency resolution.

The processor may measure the energy by summing the energy of all harmonics received at the detector. Typically for microseismic monitoring there are at least 8 and as many as 100 receivers, sometimes monitoring from multiple wells. In this case it is possible to produce a stacked amplitude averaged over many recording locations, or to provide a focused calculation by using the usual techniques of seismic migration to back project the pump harmonics onto the wellbore and stack at an imaging point near the perforation.

The processor may use an estimate of the static head of the fluid in the well prior to the start of pumping the fluid to calibrate the estimated the pressure head of the pumped fluid. This estimate of the static head can be used to scale measured amplitudes of the pump harmonics to an approximate head value.

In some embodiments of the present disclosure, the apparatus further includes a pressure detector arranged to measure the pressure at the top of said well. Measuring or monitoring the pressure at the wellhead is often unnecessary as it can be assumed that the pump harmonic amplitude is essentially constant or nearly constant at the wellhead. However, by monitoring the pressure at the wellhead, for example using a high frequency pressure gauge such as that proposed in U.S. Pat. No. 5,720,598 can provide an accurate stacked amplitude of the pump harmonics at the well head. Then the difference between this and the observed harmonics at the detector requires only an assumption of approximately constant signal attenuation through the Earth.

In certain embodiments, the processor produces the estimate substantially in real time. Here, the term "substantially in real time" is to be interpreted as providing an output within a sufficiently short time of the vibrations being detected that the data can be assumed to be effectively representative of the current situation in the well. Clearly, since the method may have built-in delays, for example in accumulating the data for the step of measuring the energy of the received vibrations, actual instantaneous information about the pressure will not be available. However, information should be available approximately a few minutes after the time that it relates to, and this is generally a short enough timescale compared to variations in the pressure within the well being monitored.

In order to be useful in providing real time information about the situation in the treatment well, it is desirable that the estimation data is available on a shorter time frame than it takes for a change in the surface fluids to reach the perforations at the other end of the well (the transit time). Typical transit times are around 2-5 minutes, so performing the steps of detecting, measuring and estimating such that the results are available less than 5 minutes after the harmonics being produced would provide useful information to an operator. Preferably the cycle is shorter, for example less than 2 minutes or even less than 1 minute.

In realistic situations, the pump schedules are generally stepped or staged with planned changes (if any) taking place every 5-20 minutes. Providing the estimate of the head on a timescale which is shorter than this schedule would therefore still be useful. Allowing for interpretation time, the steps of detecting, measuring and estimating are preferably completed within 10 minutes of the harmonics being produced, more preferably within 5 minutes and most preferably within 2 or 1 minutes as set out above.

When the head is estimated substantially in real time, the estimated values produced can be compared to values expected from the model of the fracturing and adjustments to the pumping, such as adjustments to the fluid loading, can be planned or implemented depending on the results.

Alternatively or additionally, the data can be recorded over the duration of the pumping in the well and used in post-job interpretation and modelling of the fracture. Knowing the pressure head in the well and/or the bottom-hole pressure is an important factor in modelling how the fracture has developed during the pumping operation.

The apparatus of the present aspect may include any combination of some, all or none of the above described preferred and optional features.

The apparatus of the present aspect may operate by carrying out a method according to the above first or second aspects of this disclosure, but need not do so.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Figure 1:
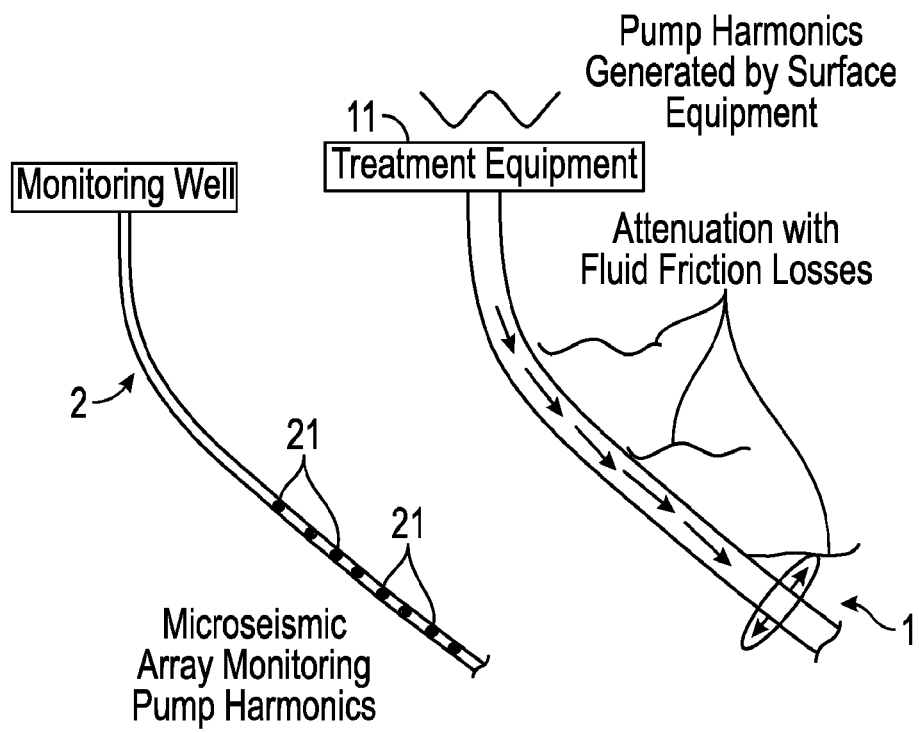
FIG. 1 shows, schematically, an apparatus according to some embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 shows the configuration of an apparatus according to some embodiments of the present disclosure. A treatment well 1 is subject to hydraulic fracturing with treatment fluid pumped by equipment 11 located at the surface. The surface equipment 11 generates harmonic vibrations which are transmitted through the treatment fluid and attenuated by fluid friction losses as they progress down the treatment well 1.

An unused well 2 nearby is used as a monitoring well and a microseismic array 21, such as the Schlumberger VSI tool, is deployed in the monitoring well 2. The microseismic array detects pump harmonics and these are processed at the surface as set out in more detail below to estimate the pressure head in the treatment well 1. The microseismic array may comprise geophones and/or accelerometers.

Figure 2:
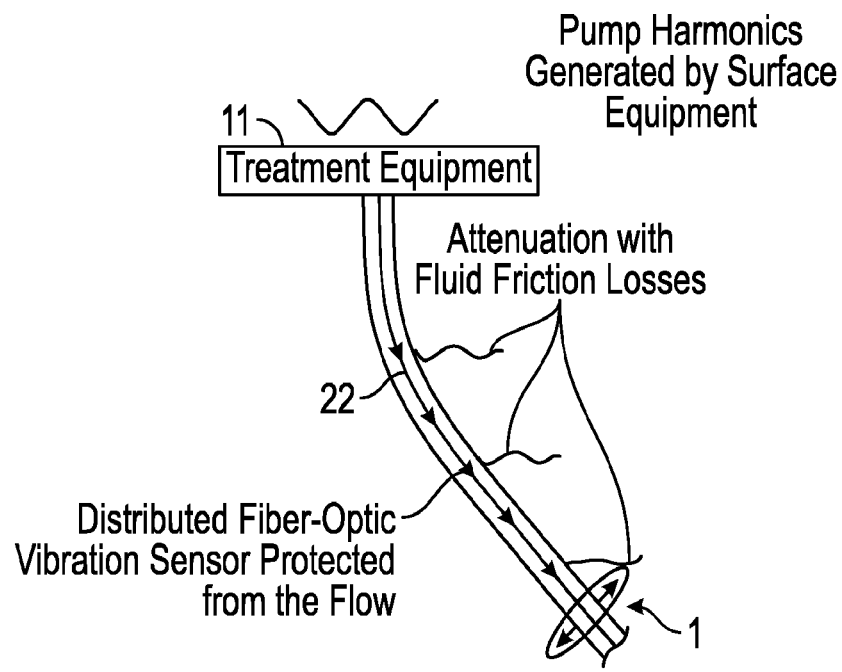
FIG. 2 shows, schematically, an apparatus according to some embodiments of the present disclosure.

FIG. 2 shows the configuration of an apparatus according to some embodiments of the present disclosure. The configuration is similar to that shown and described in relation to FIG. 1 above, but rather than detect the pump harmonics in a nearby monitoring well, the pump harmonics are detected using a distributed fibre-optic vibration sensor ("DVS") 22 which is located in the treatment well 1 but protected from the flow. The DVS 22 is deployed in an armoured cable and the treatment fluid is pumped down the outside of this cable. The tubing containing the fibre is filled with a still fluid for pressure balance but the fibre is never in contact with fluid from the treatment.

The DVS fibre-optic cable 22 is permanently cemented into the casing of the treatment well 1 and can detect vibration as longitudinal strain changes on the fibre. This will give a continuous measurement of the pump harmonics along the length of the well and the interpretation set out below can be readily applied to that type of monitoring as well as the microseismic arrays specifically discussed.

Similarly if the fibre-optic cable is deployed in a well lying within the evanescent wave detection region of the treatment well it may be used in a similar way to borehole geophones/accelerometers as described below.

Multiple fibres deployed in multiple wells may also be used for separation of propagating and non-propagating modes as described below.

Figure 3:
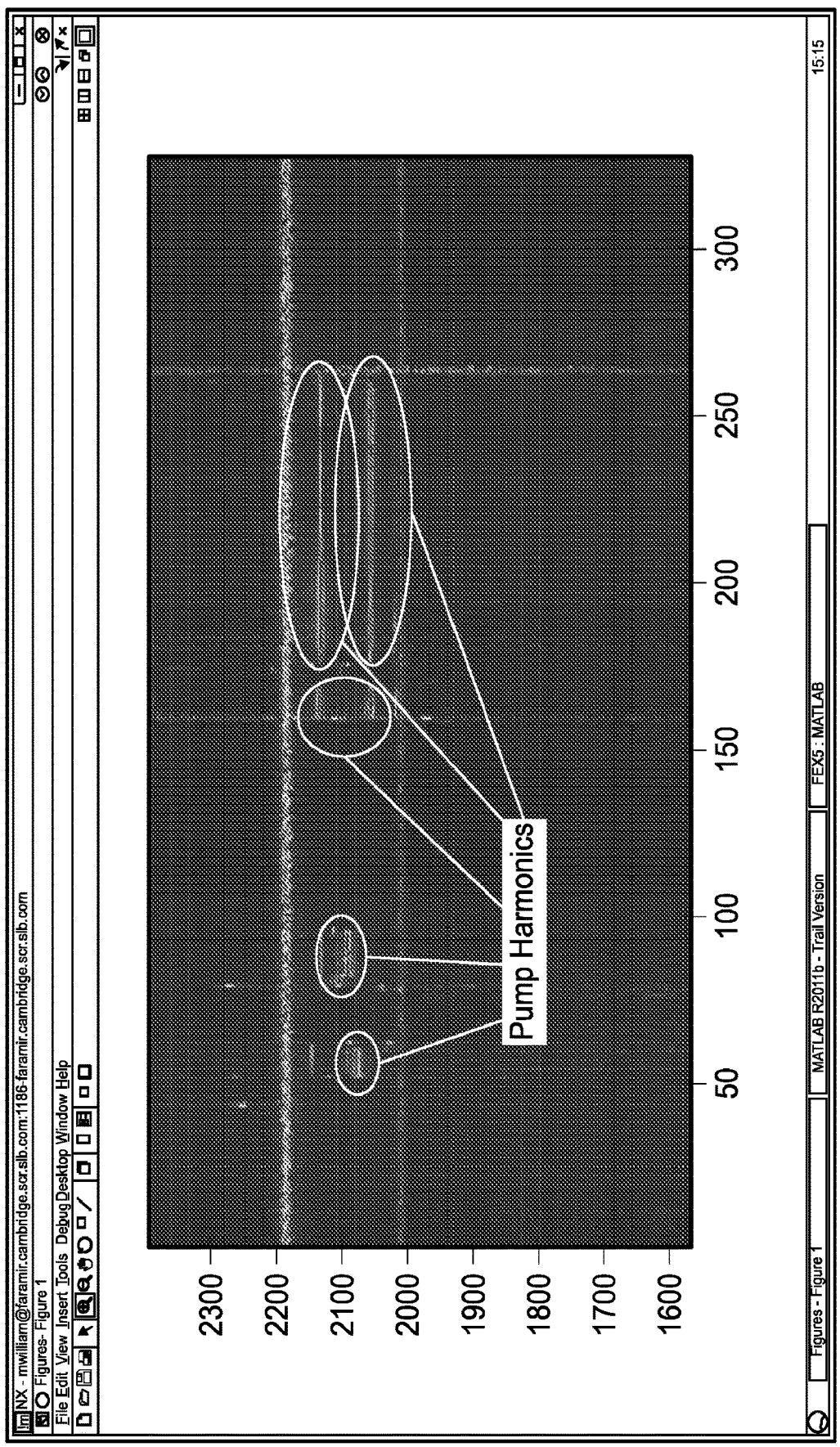
FIG. 3 shows a spectrogram of power in a range of frequency components as measured by an apparatus according to some embodiments of the present disclosure.
Figure 4:
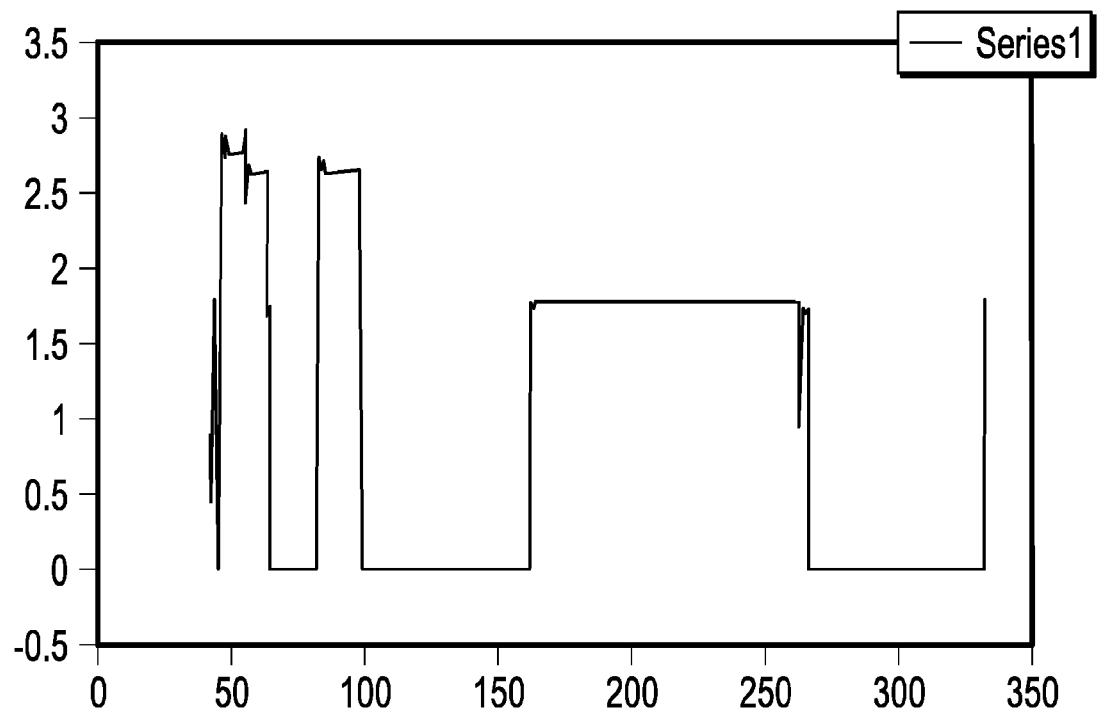
FIG. 4 shows the pump schedule for the well being monitored to produce the results shown in FIG. 3.

By way of example, the description below uses recordings made by the Schumberger VSI tool, which is designed to have a flat frequency response in the range 5-200 Hz, although other microseismic tools may be used. The observed data may be band-pass filtered to this flat response window. Then consecutive 1 minute fast Fourier transforms (FFTs) are carried out, and a spectrogram of the power constructed in each frequency component over the range 5-200 Hz. A typical result is shown in FIG. 3, and below it in FIG. 4 is shown the corresponding pump schedule:

The labelled pump harmonics in FIG. 3 correspond to two pump trucks being run at different rates which sum to give the total rate shown in the lower figure. This example was deliberately pumped at very low flow rates so that a bottom hole pressure gauge could be used in the treatment well. The red-lines will be referred to as the pump harmonics and are extracted from the data as discussed below, to provide the amplitude of the pump harmonic versus time.

The presence of a downhole memory gauge for pressure allowed the downhole pressure to be accurately recorded in this case. This downhole pressure measurement was used to estimate the flowing head of the wellbore and compare this to the flow head estimate that would have been generated if the downhole pressure was only modelled (i.e. the estimate that currently has to be used when pumping high rate sand-water fracture treatments).

Typical models for hydraulic fracturing are outlined in Reservoir Simulation 3$^{rd}$ Edition, edited by Economides and Nolte, 2000, ISBN-0-471-49192-6.

Figure 5A:
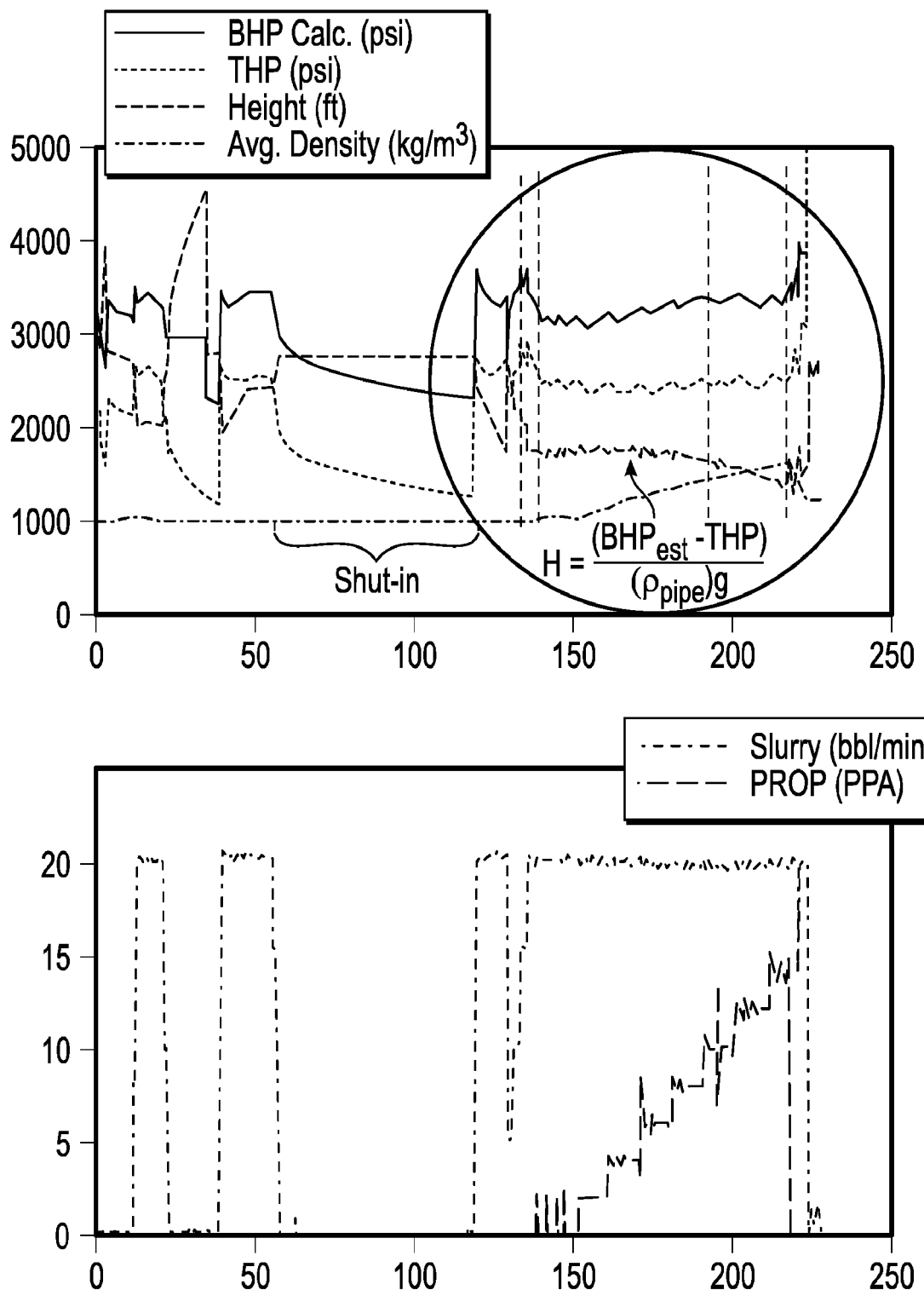
FIGS. 5a and 5b show calculations of the flowing head in a well in an example scenario, comparing the estimated bottom hole pressure (FIG. 5a) and the measured bottom hole pressure (FIG. 5b)
Figure 5B:
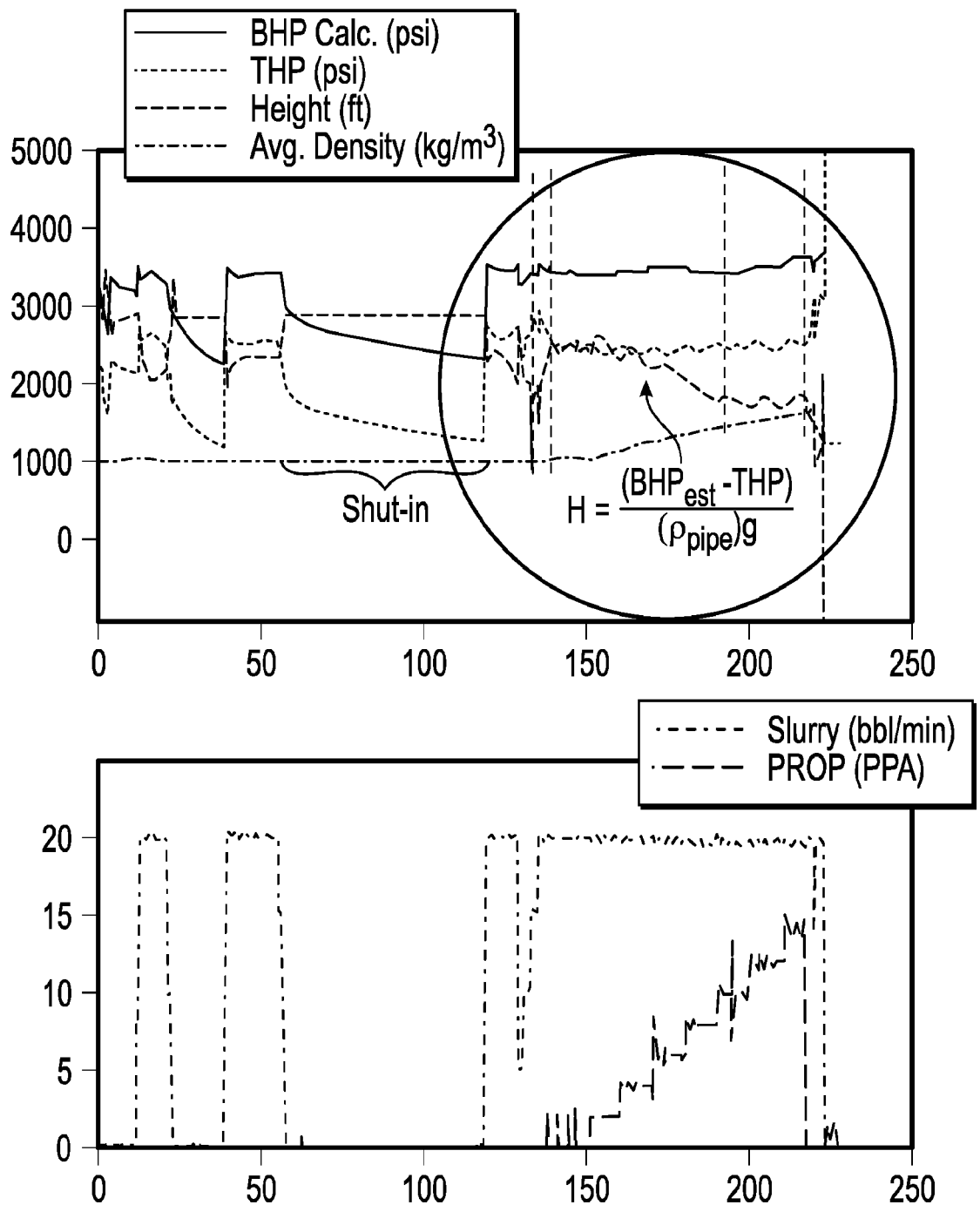

FIG. 5a shows the modelled flowing head based on estimated bottom hole pressure (BHP) from a flow calculation model, whilst FIG. 5b shows the modelled flowing head based on the measured BHP. In each case the tubing head pressure (THP) is measured at the surface, and the mean pipe density ($<\rho_{pipe}>$) is estimated from the known density of the fluid entering the well and an assumption of plug flow. g is gravity and H is the head in feet.

Figure 6:
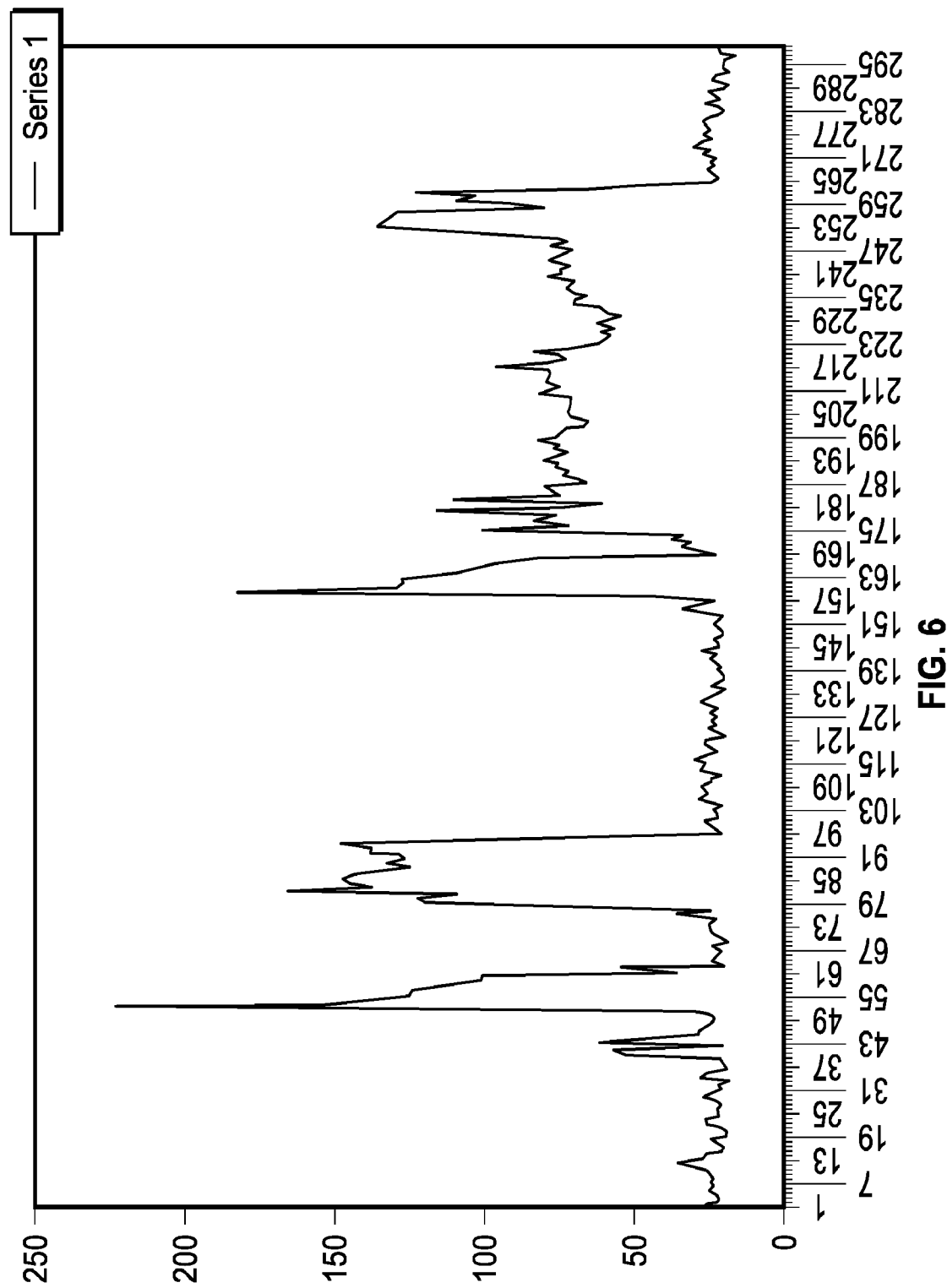
FIG. 6 shows the amplitude of the observed pump harmonics using an apparatus according to an embodiment of the present disclosure in the same scenario as FIGS. 5a and 5b.

FIG. 6 shows the amplitude of the observed pump harmonics versus time using an apparatus according to some embodiments of the present disclosure in the same scenario as FIGS. 5a and 5b. By comparison with FIG. 5b, it will be noted that the trend is somewhat similar. Naturally, the pump harmonic does not appear when the pumps are switched off and so there is no trend in the data corresponding to the periods where there was no pumping. However, in the region circled in the head calculation plots of FIGS. 5a and 5b, it can be seen that the pump harmonic amplitude trend approximately follows the response of the head calculated by using measured BHP in FIG. 5b, showing a constant level followed by a downward trend.

The trend in the pump harmonic data differs significantly towards the end of pumping. As explained below, the physical mechanism we have identified from this type of observation allows us to assert that the pump harmonic when extracted and displayed in this way may be used as proxy for head and so provides a key piece of information in the estimation of net pressure for hydraulic fracture models. In this particular case the well was known to have screened out at the perforations. Towards the end of pumping, the pump harmonic shows a dramatic rise in head (e.g. a lower density fluid flowing) which most likely corresponds to sand dropping out when the fluid slows down as a consequence of the perforation blocking mechanism that caused the screenout. Thus using the pump harmonic data in estimated the head can be seen to outperform the accuracy of even the head calculated using measured BHP.

Typically pumps used for hydraulic fracturing are multiplex cylinder-based pumps. This means that a number of cylinders (usually 3 or 5) of similar volume are filled and emptied in sequence to provide the fluid flow. Each cylinder will impart a pressure pulse in the fluid as the pump compresses the fluid in the turnaround from filling to pushing the fluid in to the wellbore system. The small differences between the cylinders mean that this is not expected to give a strong harmonic at the frequency of the individual cylinder operation. However the complete set of cylinders is driven by a crank-shaft and it is each complete cycle of all the cylinders that is strictly controlled and acts as the source of the pump harmonic. Once the pump harmonic is set-up it can travel along the pipe work and subsequently transmit as seismic energy through the formation to where it is received in an adjacent or proximate well.

It was previously shown by Huo et al. (Hou, Hunt and Williams, *Acoustic Monitoring of Pipeline Flows: Particulate Slurries*, POWDER TECHNOLOGY 106, p 30-36 (1999)) that acoustic losses in a laboratory flow-loop setting are directly linked to frictional losses in the fluid flow, and as such can be used as the basis for a flow metering concept. The conclusion of the above paper suggested that, since a calibration to each particular flow-loop would be needed; and since laboratory flow loops can be readily instrumented in other ways, this use of acoustic losses had limited application. However, the present disclosure makes use of this effect to great advantage in monitoring head for a treatment well using seismic observations at an offset well or using a DVS located in the same well.

Selection of Candidate Receivers

Typically the signals that are being interpreted using the methods according to embodiments of this disclosure are very quiet compared to other seismic applications including microseismic monitoring. This means that the methods are sensitive to the coupling of current generation borehole geophones and accelerometers. Coupling refers to the interaction between the receiver and the borehole, typically a clamping mechanism is used and this provides very low noise response. The receiver at the wellbore-most end is generally less sensitive (for the present purposes), and one or more of the other receivers may be clamped sufficiently for HFM but not sufficiently for the new purpose defined in this disclosure.

Figure 7:
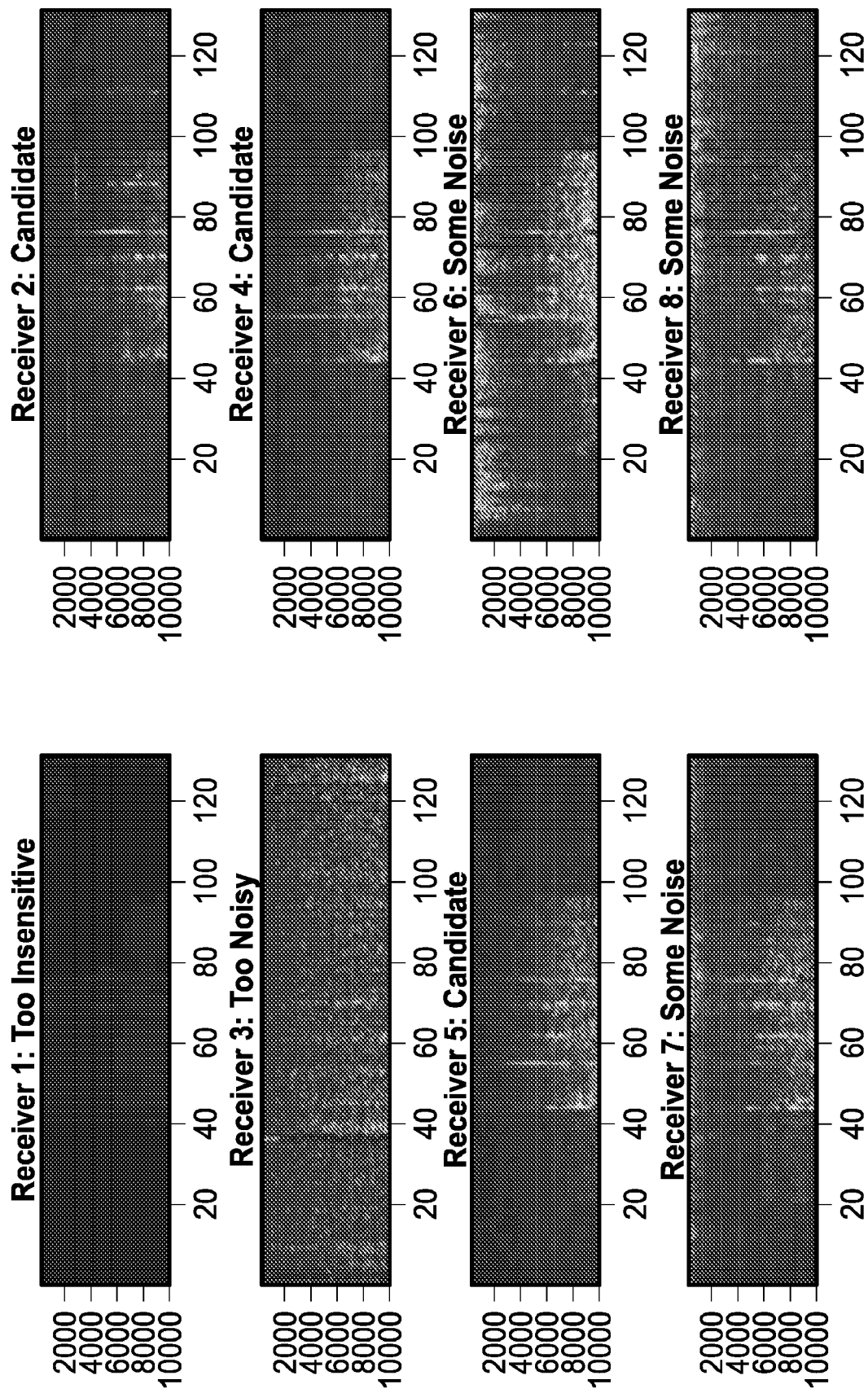
FIG. 7 shows a selection of plots of the data from different receivers in a micron seismic array to the same response.

In order to determine which receivers are suitable for use for treatment well interpretation in embodiments of the present disclosure, the simple QC plot shown in FIG. 7 is used as described below.

Firstly a threshold amplitude for well noise detection in the frequency domain is defined in terms of raw measurement (typically in the range of millivolt or microvolt response).

A time-windowed Fourier transform of the data recorded by each received is made and spectrograms are plotted at the same time and frequency resolution as is intended to be used in the measurement process.

These Fourier transforms are plotted in panels (for example as shown in FIG. 7) and by inspection allows immediate identification of panels that are too insensitive (typically only the first receiver in the array) or too noisy (the general background noise is above the chosen threshold).

For example, for the panels shown in FIG. 7, the best candidates for treatment well interpretation can be readily identified as receivers 2, 4 and 5. Receivers 6, 7 and 8 are reasonable, but not ideal as they have some noise, whilst receiver 1 is too insensitive and receiver 3 is too noisy to be usefully used.

Figure 8:
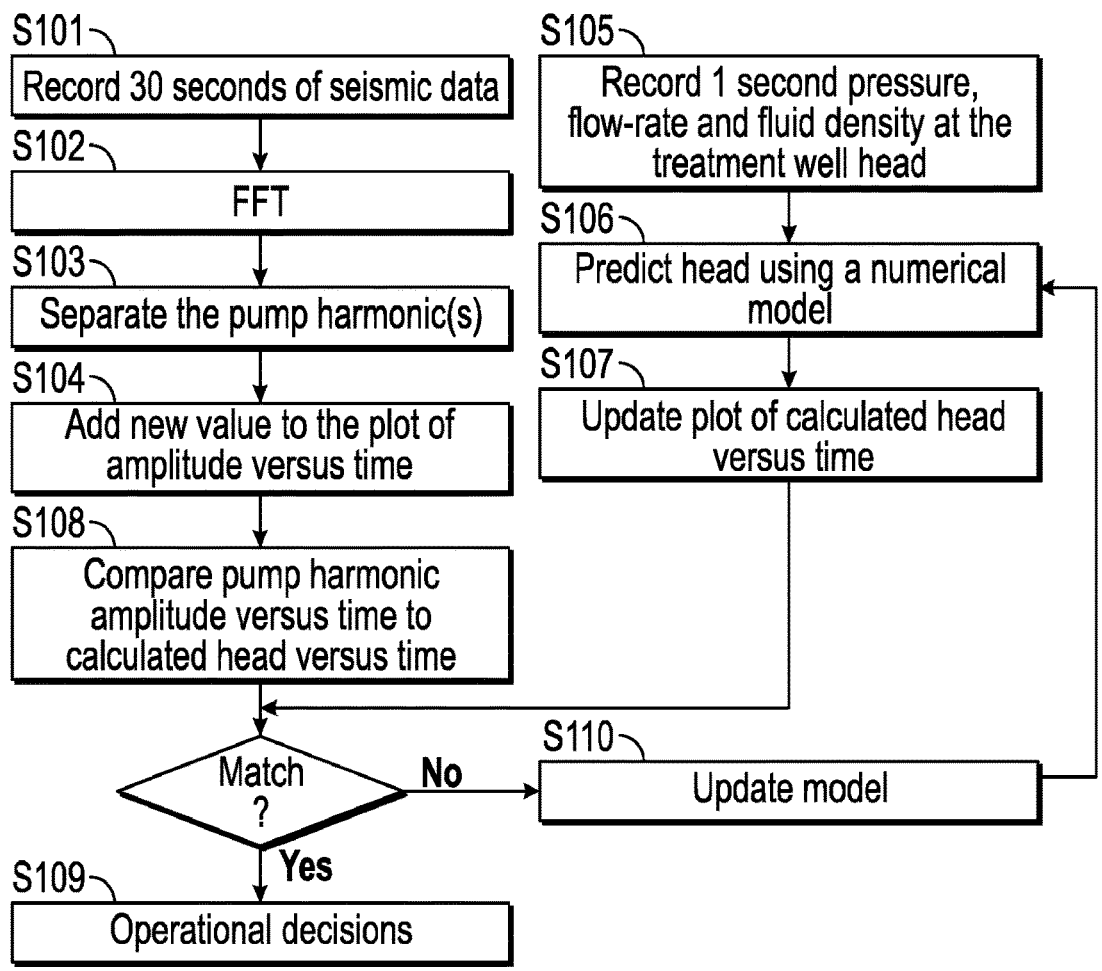
FIG. 8 is a flow chart illustrating a method according to some embodiments of the present disclosure.

FIG. 8 is a flow chart illustrating a method according to an embodiment of the present disclosure. The steps on the left hand side of the flow chart relate to the processing of the monitoring data, whilst the steps on the right hand side relate to the estimation or prediction of the head.

In processing the monitoring data, seismic data is recorded. This data is windowed into 30 second segments (S101) and then fast Fourier transformed (S102). The pump harmonic measurements are separated (S103) and added to an ongoing plot of harmonic amplitudes against time (S104).

Meanwhile, at the well head, pressure, flow rate and fluid density of the pumped treatment fluid is recorded (S105) and the head predicted using a mathematical model (S106). This is typically performed a 1 second intervals. An ongoing plot of the predicted head against time is updated (S107).

The plots of pump harmonic amplitudes and the predicted head are compared on a regular basis (S108). If the plots match within an acceptable error range, then the head prediction is accepted and the head data can be passed forward for operational decisions to be made (S109). If the plots do not match to within an acceptable error range, then the head prediction is rejected and the mathematical model used to predict it is updated (S110) for example by updating the local density distribution along the pipe. In this way potential points where proppant is dropped, rather than carried by turbulent mixing (as intended) can be identified and operational decisions (S109) taken to remedy any problems.

Figure 9:
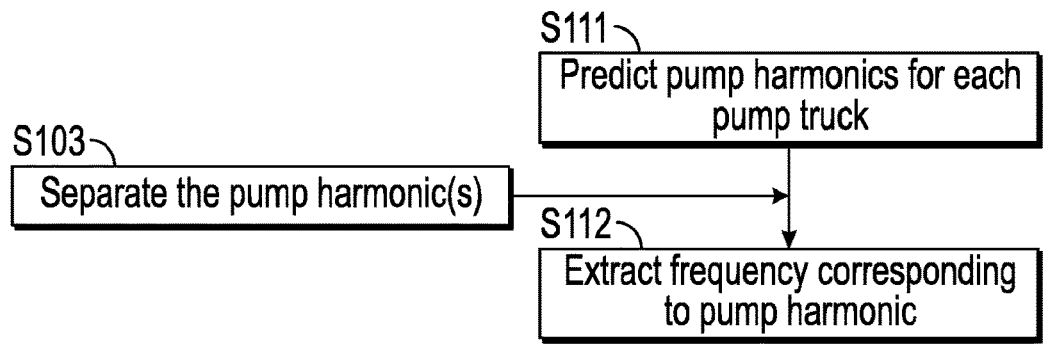
FIG. 9 is a flow chart expanding the step of separating the pump harmonics from the method shown in FIG. 8.

As shown in FIG. 9, in particular embodiments, the step S103 of separating the pump harmonics preferably includes the sub-steps of predicting S111 the pump harmonics for each pump or pump truck and extracting S112 the frequency corresponding to each pump harmonic from the FFT of the seismic data.

Once candidate receivers have been identified it may be desirable to further eliminate local receiver (i.e. independent) noise. Since the embodiments of this disclosure will typically only use a small number of receivers, stacking (summing the responses from multiple receivers) will not necessarily remove unwanted spikes. This is because stacking only removes independent identically distributed noise as a $\sqrt{N}$ process, where N is the number of receivers.

In particular, if the individual pump truck information is not provided, and therefore the pump harmonics are not predicted, lines corresponding to pump harmonics need to be identified as separate from any other narrow band frequency response that might be an anomaly in an individual receiver's response.

Figure 10:
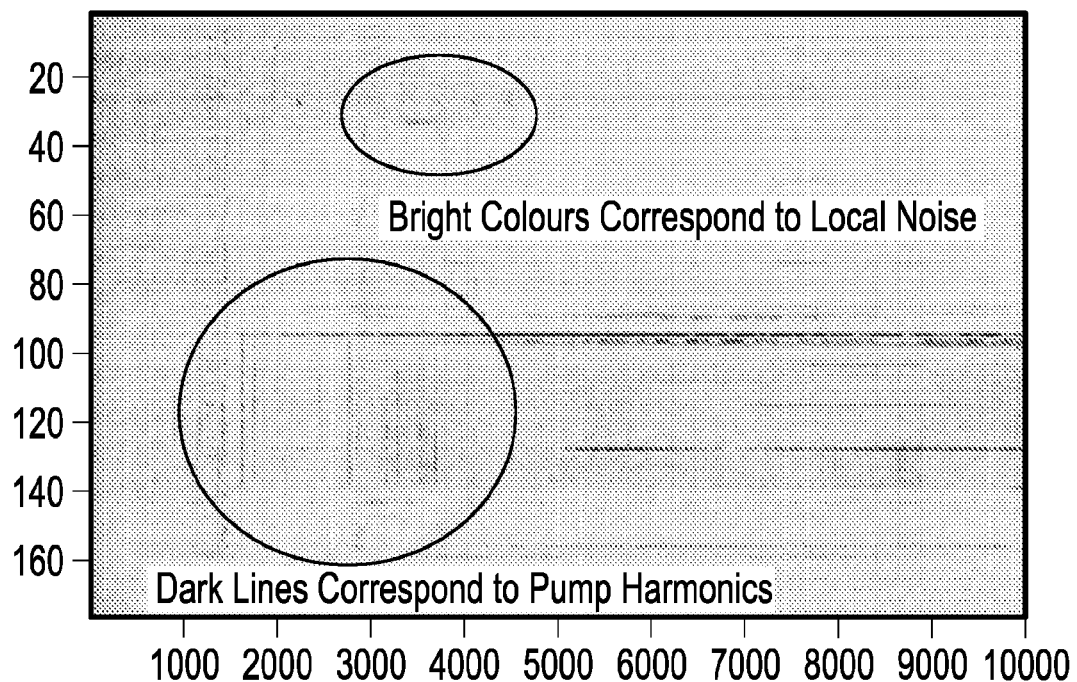
FIG. 10 shows a false colour image of the spectrograms from three different receivers, demonstrating how pump harmonics can be separated from local noise.

Therefore, instead of stacking, a false colour image can be used. The spectrograms from three receivers are produced as intensity maps (gray-scale, 0-1). One is assigned to be red, one to be green and one to be blue in an RGB colour image. For ease of interpretation, this is plotted as (1-RGB), so that the background is light. In this image, signal consistent on all three receivers is coloured black, whilst bright red, blue or green corresponds to strong noise spikes present only on a single receiver. In general lighter colours correspond to independent noise or low level background noise. An example of such plot is shown in FIG. 10 which shows how local noise can be separated from pump harmonics.

Interpretation of Other Well-Bore Modes

Figure 16:
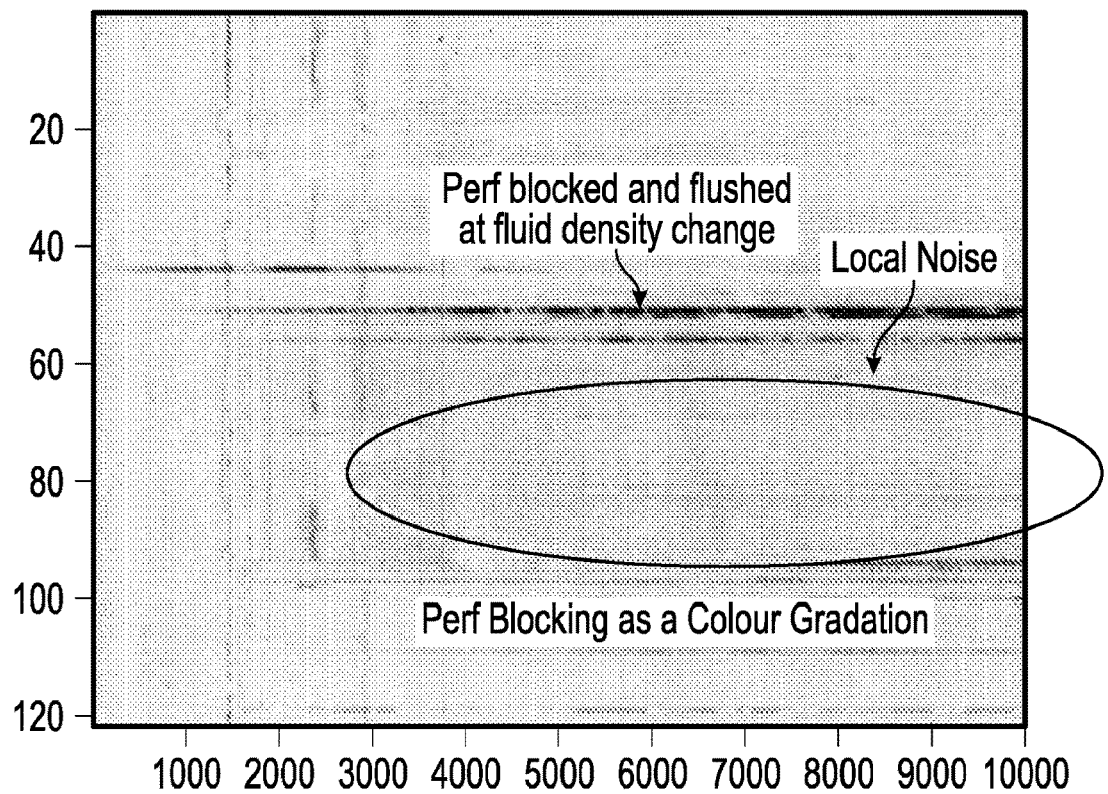
FIG. 16 shows a further false colour image of spectrograms from multiple receivers and illustrates how different features can be identified.

In addition to the pump harmonics, other wellbore flow modes may be activated by the treatment well. Of particular interest is the phenomenon known as "perf(oration) blocking". When a fluid is sand-laden its effective viscosity will increase. Treatments are designed so that the pump rates should be high enough that the fluid will flow at high Reynolds numbers and so be very turbulent and will carry the proppant by turbulent mixing. However the Reynolds number is sensitive to changes in bulk density and viscosity. Specifically, if the effective viscosity increases more rapidly than the bulk density the Reynolds number will decrease. If the Reynolds number of the flow decreases too far, a laminar rather than turbulent flow regime will establish itself. In a laminar flow regime the proppant can sink and collect within a long horizontal wellbore. Subsequent flow can then flush this sand to the perforations leading to the perforations becoming blocked. This blocking will set up a standing wave in the fluid column which can be recognized as a notched spectrum as shown in FIG. 16, described in more detail below.

The identification and interpretation of this perf blocking signal allow the treatment to be redesigned to improve its effects. For example higher fluid flow rates may be used to encourage mixing, or lower proppant concentrations used to reduce the bulk fluid's effective viscosity. Viscosity reducing chemical additives are also available and can be added.

The temporary blocking due to a change in proppant loading of the fluid can also be problematic, although it is a lesser effect. Any blocking event has the risk of near well-bore screenout. Consequently the capability to identify whether a change in proppant loading has caused a temporary blocking event is a useful indicator that the steps in proppant loading could be reduced or ramped to mitigate the risk of near wellbore screenout. In this case an acoustic event consistent with blocking would be expected, but which does not continue for an extended period of time, and which occurs at approximately the time the step in proppant loading would reach the perforations (for example based on a simple estimate of plug flow).

Separation of Propagating and Non-Propagating Modes

It has been noted by the present inventors that wellbore modes consist largely of evanescent waves and that low frequency acoustic signals generated in the wellbore will not in general propagate into the formation so long as the shear wave speed of the formation is faster than the acoustic wave speed of the fluid in the well. In this (the most common) circumstance, it is expected that waves occurring within the wellbore are evanescent and so decay exponentially with distance from the wellbore, whereas propagating low frequency waves would show very little attenuation over the same distances. In situations where treatment well waves are evanescent, any detected propagating waves are candidates for waves of geophysical origin (e.g. slow fracture waves).

Differentiating between evanescent waves and propagating waves is therefore important for identifying whether sources are confined to the treatment well or are present in the placed fracture geometry.

One way of differentiating between the types of waves is to position two arrays in horizontal wells near the treatment well, one of which is closer to the treatment well and one further away. By monitoring from multiple wells it is possible to distinguish between evanescent and propagating waves by the use of false colour images as described below.

Figure 11:
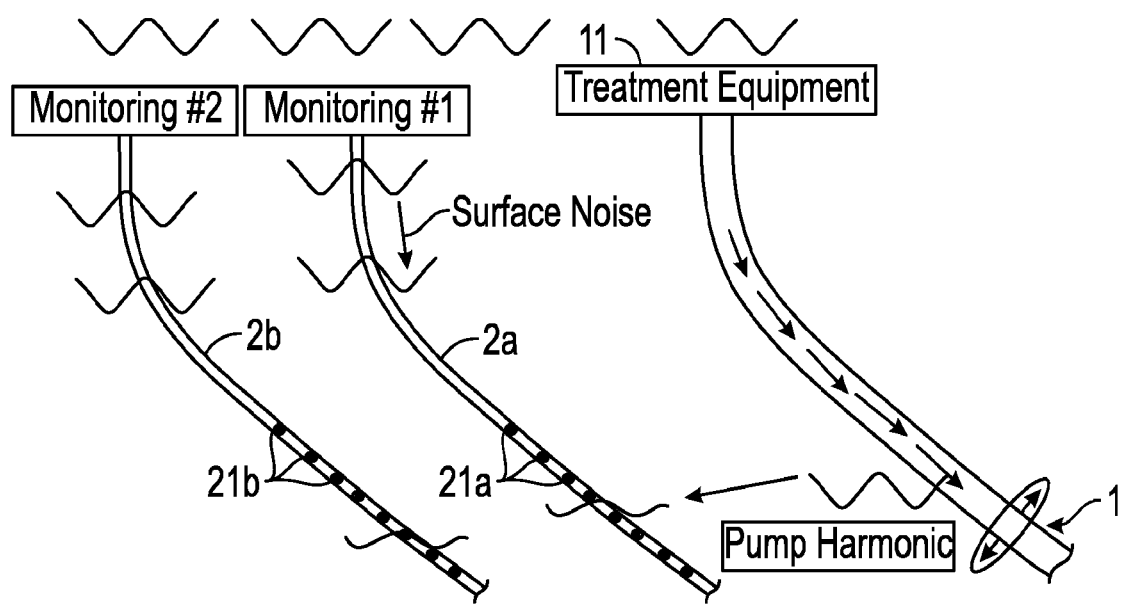
FIG. 11 shows how embodiments of the present disclosure can discriminate between propagating waves and evanescent waves.

FIG. 11 shows an apparatus according to an embodiment of the disclosure which is configured to differentiate between evanescent and propagating waves. The configuration is very similar to that shown in FIG. 1, except that there are two monitoring wells 2a, 2b each with a microseismic array 21a, 21b. Further monitoring wells may be used depending on the availability and proximity of suitable wells and their configuration.

Figure 12:
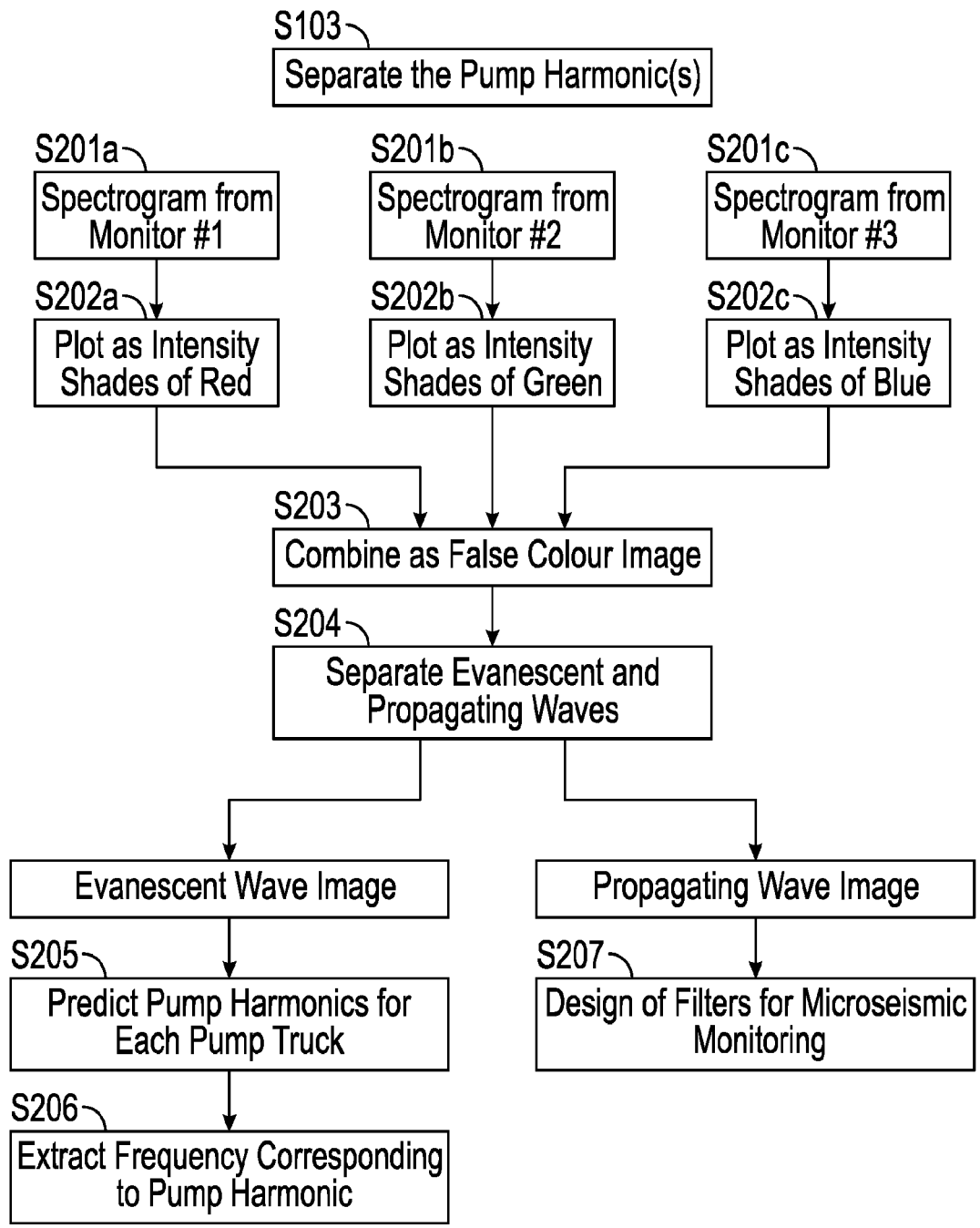
FIG. 12 is a flow chart illustrating a method according to a further embodiment of the present disclosure which separates propagating and evanescent waves.

FIG. 12 is a flow chart showing the additional steps which are carried out in a method according to an embodiment of this disclosure in which evanescent waves are separated out. Typically these steps would be performed as part of the step of separating the pump harmonics (S103) from FIG. 8.

30 second or 1 minute Fourier Transform spectrograms are taken S201a-S201c from three receivers at varying distances from the treatment well (if multiple well monitoring is used these can be from separate wells). The spectrograms are thresholded and scaled (as described above in relation to the use of false colour images for local noise identification) and the results from each receiver are set to be one each of red, green and blue S202a-S202c and combined in a composite image S203. Any exponentially decaying energy will be dominated by the colour assigned to the closest receiver with successively smaller contributions of other colours (e.g. dark red/brown/grey). Conversely, propagating energy will contribute similar colour levels for each colour (light colours with white as the zero attenuation limit). The resultant image can be examined for bright spots which correspond to the propagating waves.

Figure 13:
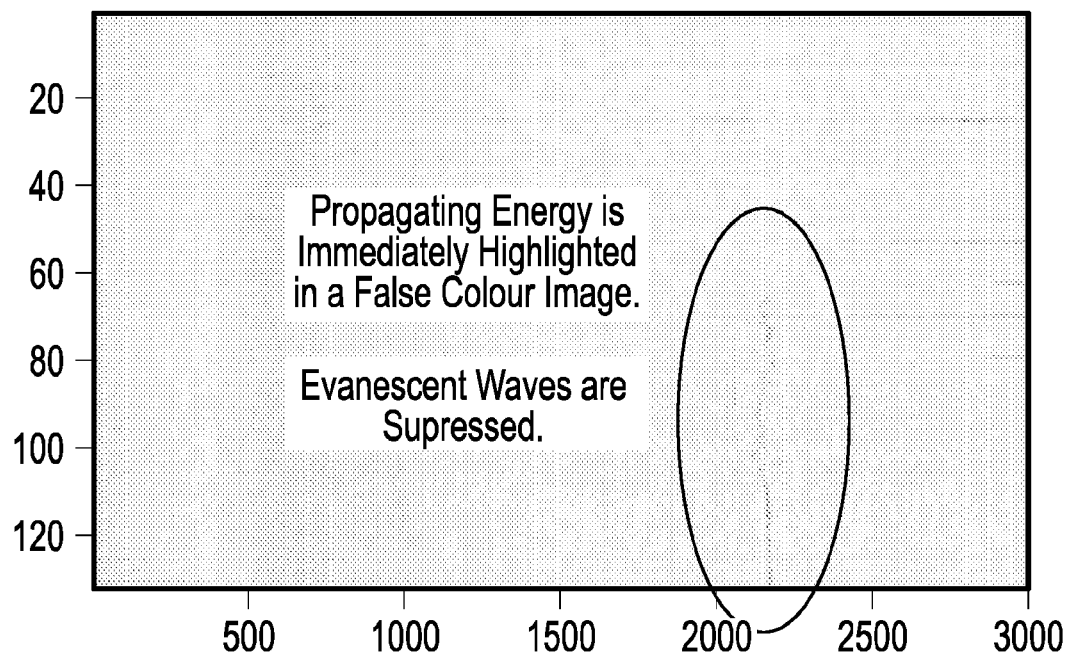
FIG. 13 shows a false colour image of the spectrograms from three receivers at different distances from the source, demonstrating how propagating waves can be identified.

An alternative, and preferred arrangement is to use one minus the spectrogram in the false colour image. This means that the propagating waves can be identified as bold colours against a light background as shown in FIG. 13.

Figure 14:
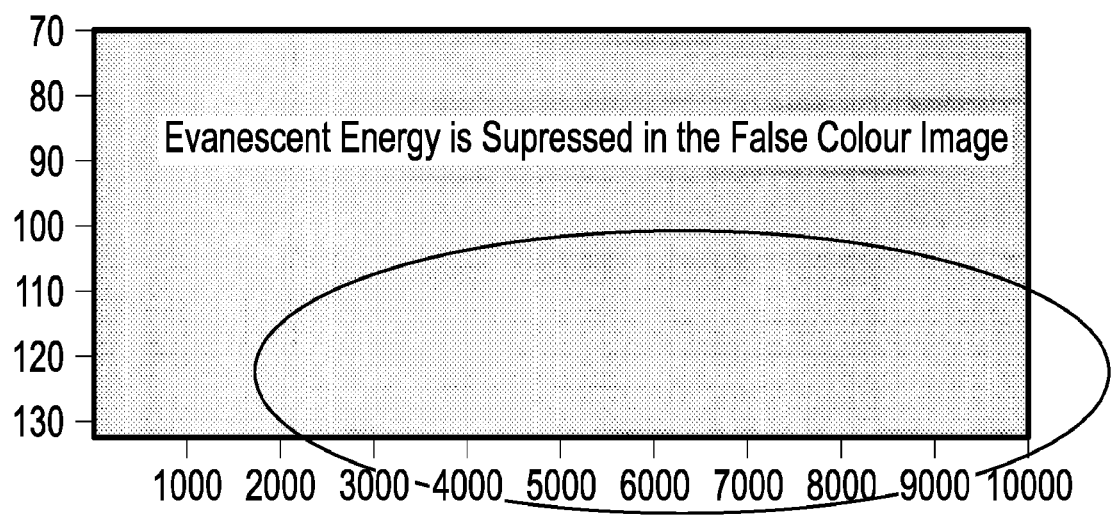
FIGS. 14 and 15 show a comparison between, respectively, the false colour image of spectrograms from multiple receivers and a single spectrogram from the receiver closest to the source.
Figure 15:
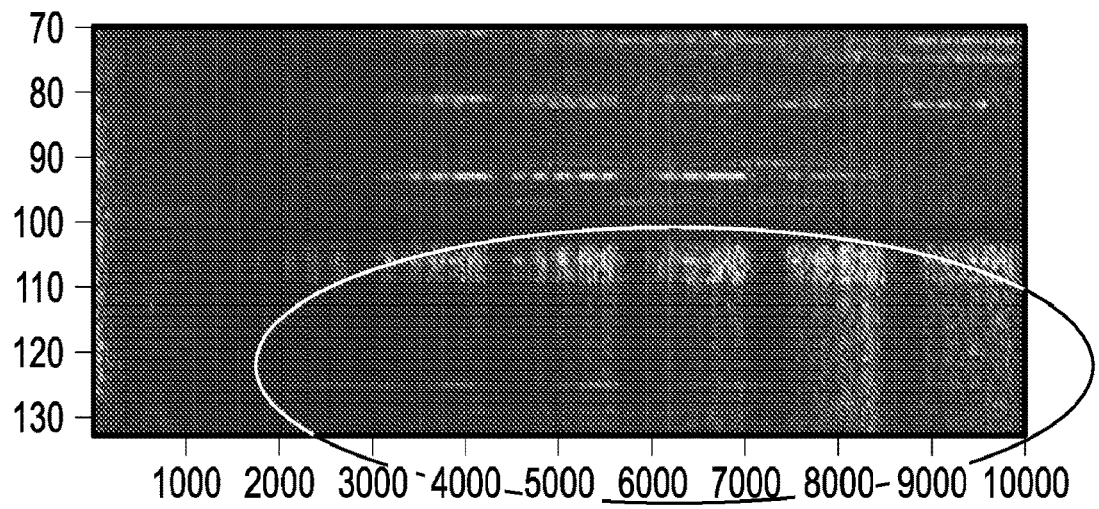

Direct comparison between the false colour image and the image from the receiver closest to the treatment well readily identifies evanescent energy—for example the perf blocking signature shown in the comparison between FIGS. 14 and 15.

This approach therefore allows ready identification of evanescent waves by comparison to the closest receiver's individual image.

The evanescent and propagating waves can then be separated S204. The evanescent wave image can be used to predict the pump harmonic frequencies for each pump/pump truck S205 (for example, where these are not predicted or calculated in advance) and extract S206 the amplitude of the frequencies in the spectrogram corresponding to the pump harmonics.

The propagating wave image can also be used, for example for the design of filters for microseismic modelling S207. For example, notch filters, which separate these propagating waves for separate analysis and remove them from the microseismic analysis where they would disrupt hodogram identification of the arrival detection of a microseismic event, could be designed from this image.

It is noted that differences between individual receivers, clamping, formation surrounding the monitoring well and completion quality (e.g. cementing) of the monitoring well all provide sources of uncertainty when trying to compare receivers located in separate wells. As described earlier, the use of a false colour image is very tolerant of these sources of uncertainty and allows the rapid identification of features for further investigation.

Interpretation Guide

As set out above, repeating features corresponding to perforation blocking, and treatment well harmonics may be clearly identified from these false colour images. In order to identify such features, an interpretation guide and a catalogue of example interpretations can be provided, both for training interpreters and for use as an aid to interpretation.

Indeed, modern pattern and colour matching techniques (e.g. neural network identifiers) are well known and can readily be applied to automate or semi-automate the interpretation of the false colour images using the catalogue as a training set.

The systems and methods of the above embodiments may be implemented in whole or in part in a computer system (in particular in computer hardware or in computer software) in addition to the structural components and user interactions described.

Furthermore, although the methods of the above embodiments have been described as being implemented on the systems of the embodiments described, the methods and systems of the present invention need not be implemented in conjunction with each other, but can be implemented on alternative systems or using alternative methods respectively.

All references referred to above are hereby incorporated by reference.

The invention claimed is:

1. A method of estimating a pressure head of a fluid pumped into a well, the method comprising:
   receiving vibrations at a detector not in contact with the fluid, wherein the vibrations are generated by pumps pumping the fluid into the well and are transmitted through the fluid, and wherein the vibrations transmitted by the pumps through the fluid in the well comprise at least one harmonic frequency;
   measuring an energy of the received vibrations at the or each harmonic frequency; and
   estimating the pressure head of the pumped fluid in the well from the measured energy.

2. The method according to claim 1 wherein the vibrations are detected by a microseismic array.

3. The method according to claim 1 wherein the vibrations are detected by an hDVS detector.

4. The method according to claim 1, further comprising calculating the at least one harmonic frequency.

5. The method according to claim 1, wherein measuring the energy of the received vibrations includes performing fast Fourier transforms on the received data repeatedly over time.

6. The method according to claim 5 wherein the fast Fourier transforms are performed on at least 30 seconds of received data.

7. The method according to claim 1 wherein the step of measuring includes the step of summing the energy of all harmonics received at the detector.

8. The method according to claim 1, further comprising:
   estimating a static head of the fluid in the well prior to pumping the fluid into the well; and
   using the estimated static head to calibrate the estimated pressure head of the pumped fluid.

9. The method according to claim 1, further comprising: measuring pressure at a top location of said well.

10. The method according to claim 1 wherein the detecting, the measuring, and the estimating are performed substantially in real time.

11. A method of controlling a pumping operation in a well, the method comprising:
   receiving vibrations at a detector not in contact with a fluid, wherein the vibrations are generated by pumps pumping the fluid into the well and are transmitted through the fluid, and wherein the vibrations transmitted by the pumps through the fluid in the well comprise at least one harmonic frequency;
   measuring an energy of the received vibrations at the or each harmonic frequency;
   estimating the pressure head of the pumped fluid in the well from the measured energy, wherein the detecting, the measuring, and the estimating are performed substantially in real time; and
   controlling the pumping of fluid into the well depending on the estimated pressure head.

12. An apparatus for estimating a pressure head of fluid pumped into a well, the apparatus including:
   a detector not in contact with the fluid and arranged to receive vibrations generated by one or more pumps pumping the fluid into the well, the vibrations being transmitted through the fluid in the well; and
   a processor configured to:
      process the received vibrations;
      measure an energy of the vibrations at at least one harmonic frequency of the one or more pumps; and
      estimate the pressure head of the pumped fluid in the well from the measured energy.

13. The apparatus according to claim 12 wherein the detector is a microseismic array.

14. The apparatus according to claim 12 wherein the detector includes an hDVS detector.

15. The apparatus according to claim 12, wherein the processor is configured to measure the energy of the received vibrations by performing fast Fourier transforms on the received data repeatedly over time.

16. The apparatus according to claim 15 wherein the fast Fourier transforms are performed on at least 30 seconds of received data.

17. The apparatus according to claim 12 wherein the processor measures the energy by summing the energy of all harmonics received at the detector.

18. The apparatus according to claim 12, wherein the processor uses an estimate of a static head of the fluid in the well prior to the start of pumping the fluid to calibrate the estimated pressure head of the pumped fluid.

19. The apparatus according to claim 12 wherein the estimation of the pressure head is performed substantially in real time.

* * * * *